(12) United States Patent
Shi et al.

(10) Patent No.: US 10,190,634 B1
(45) Date of Patent: Jan. 29, 2019

(54) TURBO-CHARGER BEARING

(71) Applicant: GM Global Technology Operations LLC, Detroit, MI (US)

(72) Inventors: Fanghui Shi, Bloomfield Hills, MI (US); Dingfeng Deng, Auburn Hills, MI (US); Ran Wu, Auburn Hills, MI (US); Louis P. Begin, Rochester, MI (US); Yuli Huang, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/646,633

(22) Filed: Jul. 11, 2017

(51) Int. Cl.
| | |
|---|---|
| F16C 17/18 | (2006.01) |
| F16C 33/10 | (2006.01) |
| F16C 33/66 | (2006.01) |
| F01D 25/16 | (2006.01) |
| F01D 25/18 | (2006.01) |
| F16C 32/06 | (2006.01) |

(52) U.S. Cl.
CPC .......... F16C 33/6629 (2013.01); F16C 17/18 (2013.01); F16C 32/0644 (2013.01); F16C 33/6659 (2013.01); *F01D 25/186* (2013.01); *F05D 2220/40* (2013.01); *F05D 2260/98* (2013.01); *F16C 2360/24* (2013.01)

(58) Field of Classification Search
CPC .... F16C 17/18; F16C 32/044; F16C 32/0644; F16C 33/10; F16C 33/1045; F16C 33/6659; F16C 33/6629; F16C 2360/24; F05D 2220/40; F05D 2260/98; F01D 25/166; F01D 25/186

USPC ......... 384/99, 129, 275, 282, 286, 313, 322, 384/416; 415/111

See application file for complete search history.

(56) References Cited

U.S. PATENT DOCUMENTS

| | | | | |
|---|---|---|---|---|
| 4,460,284 A | * | 7/1984 | Lauterbach | F01D 25/164 384/126 |
| 5,169,242 A | * | 12/1992 | Blase | F01D 25/164 384/107 |
| 8,317,400 B2 | * | 11/2012 | Petitjean | F01D 25/166 29/898.041 |
| 9,599,149 B2 | * | 3/2017 | Ryu | F01D 25/16 |
| 9,683,600 B2 | * | 6/2017 | Park | F16C 33/6659 |
| 2012/0237149 A1 | * | 9/2012 | Uesugi | F01D 25/166 384/397 |

(Continued)

FOREIGN PATENT DOCUMENTS

| | | | | |
|---|---|---|---|---|
| CN | 204755575 U | * | 11/2015 | ............. F16C 17/12 |
| JP | 2014034879 A | * | 2/2014 | ............. F16C 17/18 |
| WO | WO-2016006459 A1 | * | 1/2016 | ............. F16C 27/02 |

*Primary Examiner* — Marcus Charles
(74) *Attorney, Agent, or Firm* — Harness, Dickey & Pierce, P.L.C.

(57) ABSTRACT

A turbocharger including a housing and a rotary assembly disposed within the housing and including a turbine wheel and a compressor wheel attached to one another by a shaft. The rotary assembly being subject to aero-load in a lateral direction. A bearing is disposed in the housing and rotatably supports the shaft, the bearing including an inner bearing surface that engages the shaft and an outer bearing surface that engages the housing, the outer bearing surface having a pair of axially extending recessed grooves extending at least partially along the bearing. The pair of axially extending grooves being located perpendicular to the aero-load direction.

5 Claims, 3 Drawing Sheets

(56) References Cited

U.S. PATENT DOCUMENTS

| | | | | |
|---|---|---|---|---|
| 2014/0212283 | A1* | 7/2014 | Kirk | F01D 25/166 |
| | | | | 415/208.1 |
| 2015/0315932 | A1* | 11/2015 | Ryu | F01D 25/166 |
| | | | | 384/108 |
| 2016/0348577 | A1* | 12/2016 | Uneura | F01D 25/20 |
| 2017/0044933 | A1* | 2/2017 | Uneura | F16C 17/18 |
| 2017/0045085 | A1* | 2/2017 | Sugiura | F16C 17/02 |

* cited by examiner

TURBO-CHARGER BEARING

FIELD

The present disclosure relates to a turbo-charger bearing and more particularly to a bearing axial slot design for both NVH and durability performance.

BACKGROUND AND SUMMARY

This section provides background information related to the present disclosure which is not necessarily prior art.

Internal combustion engines are used to generate considerable levels of power for prolonged periods of time on a dependable basis. Many such engine assemblies employ a boosting device, such as an exhaust gas turbine driven turbocharger, to compress the airflow before it enters the intake manifold of the engine in order to increase power and efficiency.

Specifically, a turbocharger utilizes a centrifugal gas compressor that forces more air and, thus, more oxygen into the combustion chambers of the engine than is otherwise achievable with ambient atmospheric pressure. The additional mass of oxygen-containing air that is forced into the engine improves the engine's volumetric efficiency, allowing it to burn more fuel in a given cycle, and thereby produce more power.

A typical turbocharger employs a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly.

Sub synchronous frequency vibration noise can be a concern in a turbocharger. The semi-floating or fully floating turbo-charger bearing according to the principles of the present disclosure is designed to minimize sub synchronous vibration and maintain the load capacity.

A partial admission turbocharger is provided including a housing and a rotary assembly disposed within the housing and including a turbine wheel and a compressor wheel attached to one another by a shaft. The rotary assembly being subject to aero-load in a lateral direction. A bearing is disposed in the housing and rotatably supports the shaft, the bearing including an inner bearing surface that engages the shaft and an outer bearing surface that engages the housing, the outer bearing surface having a pair of axially extending recessed grooves extending at least partially along the bearing. The pair of axially extending grooves being located perpendicular to the aero-load direction.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
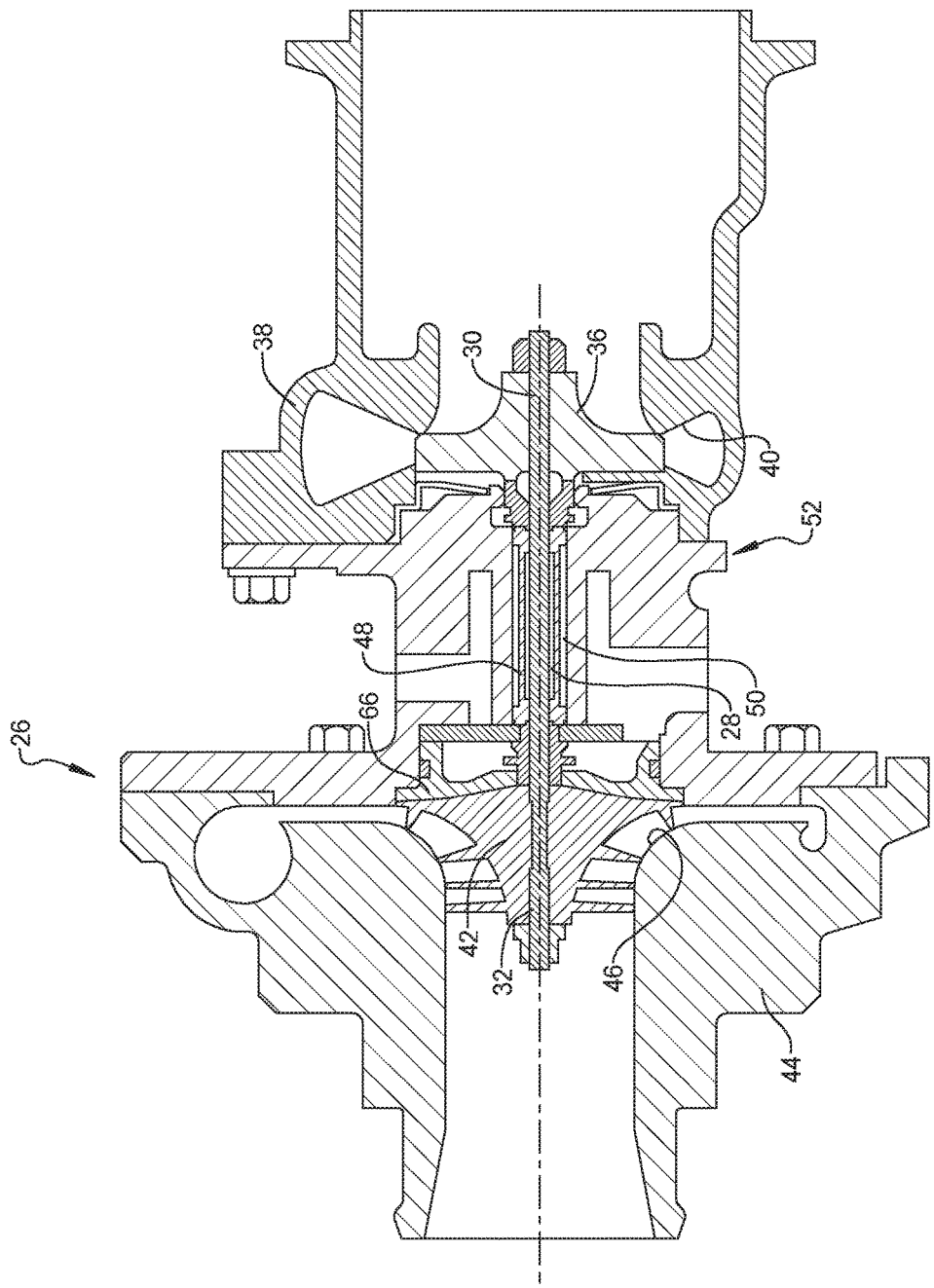
FIG. 1 is a schematic cross-sectional illustration of the turbocharger.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
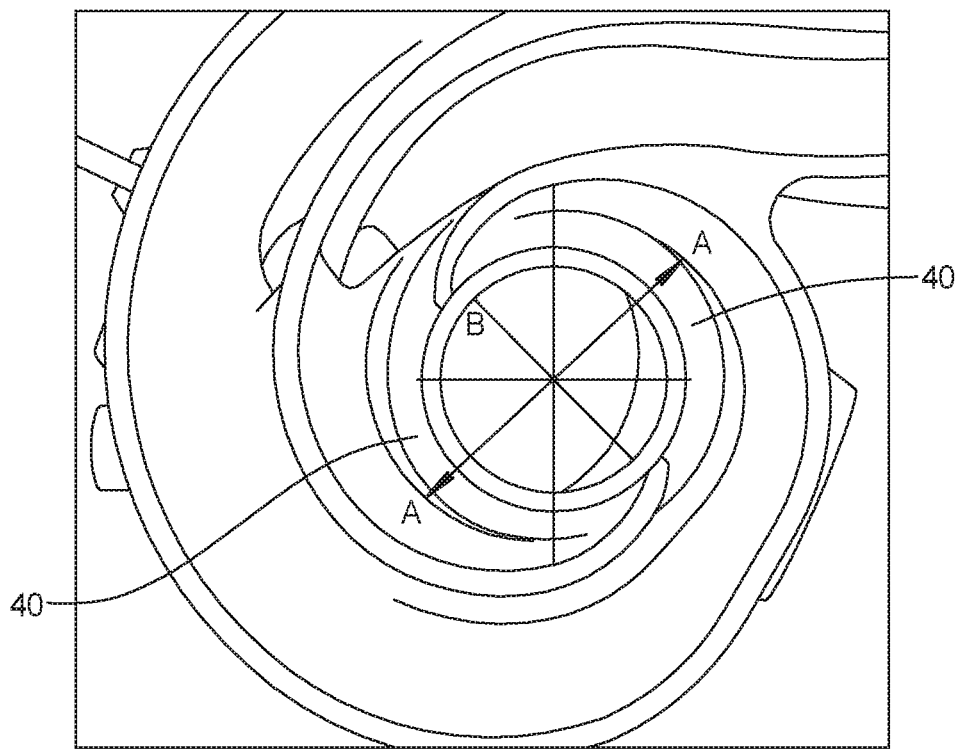
FIG. 2 is a schematic view of a partial admission turbocharger.

As shown in FIG. 1, a turbocharger 26 includes a shaft 28 having a first end 30 and a second end 32. A turbine wheel 36 is mounted on the shaft 28 proximate to the first end 30 and configured to be rotated by combustion exhaust gasses emitted from an engine. The turbine wheel 36 is typically formed from a temperature and oxidation resistant material, such as a nickel-chromium-based "inconel" super-alloy to reliably withstand temperatures of the combustion exhaust gasses which in some engines may approach 2,000 degrees Fahrenheit. The turbine wheel 36 is disposed inside a turbine housing 38 that includes a partial admission inlet arrangement 40, meaning that the exhaust gases enter the turbine wheel 36 over only a portion of the annulus, as shown in FIG. 2. The turbine airfoils operate in an unsteady flow environment that is strongly dependent on the circumferential location of the airfoils. In particular, as shown in FIG. 2, the partial admission turbocharger 26 has an aero-load direction as shown by the directional arrows "A" for the arrangement shown.

As further shown in FIG. 1, the turbocharger 26 also includes a compressor wheel 42 mounted on the shaft 28 proximate to the second end 32. The compressor wheel 42 is configured to pressurize the airflow being received from the ambient for eventual delivery to the cylinders. The compressor wheel 42 is disposed inside a compressor cover 44 that includes a volute or scroll 46. The scroll 46 receives the airflow and directs the airflow to the throttle valve and the intake manifold. Accordingly, rotation is imparted to the shaft 28 by the combustion exhaust gases energizing the turbine wheel 36, and is in turn communicated to the compressor wheel 42.

Figure 3:
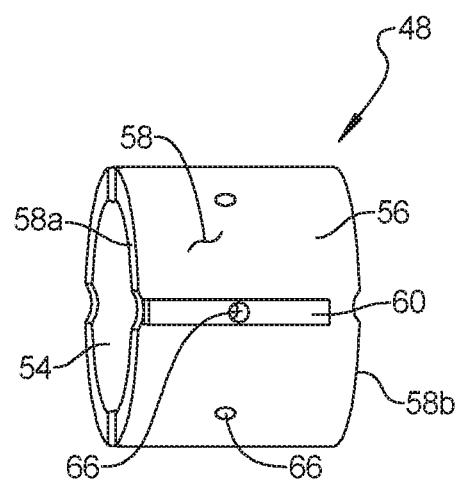
FIG. 3 is a perspective view of a bearing according to the principles of the present disclosure.
Figure 4:
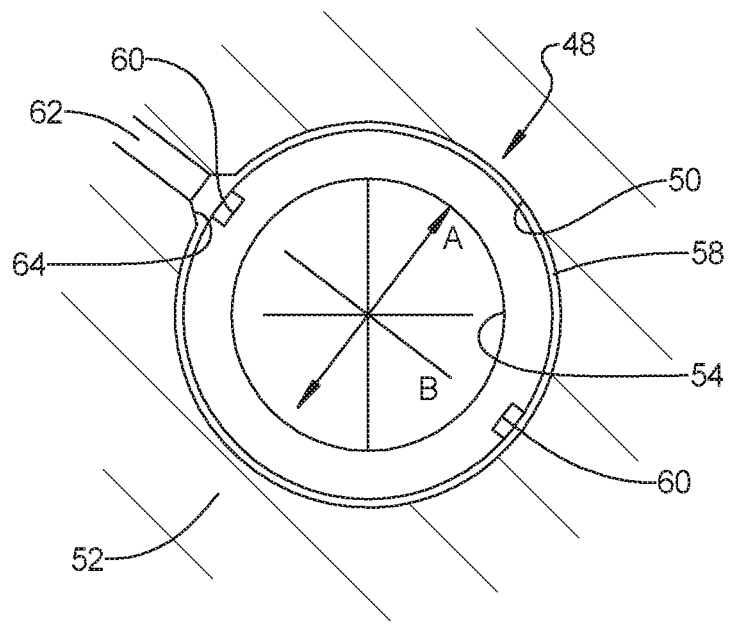
FIG. 4 is an end plan view of the bearing shown in FIG. 3.

With continued reference to FIG. 1, the shaft 28 is supported for rotation via a bearing 48. The bearing 48 is mounted in a bore 50 of a bearing housing 52 and is lubricated and cooled by a supply of pressurized oil. As shown in FIG. 3, the bearing 48 includes an inner bearing surfaces 54 that contacts the shaft 28 and an outer bearing surfaces 56 that contact the bore 50 of the housing. The outer bearing surface 56 includes a cylindrical outer surface 58 with a pair of axially extending grooves 60 recessed relative to the cylindrical outer surface 58. The axially extending grooves 60 extend from an end edge 58a of the bearing 48 and terminates before the opposite end edge 58b. The grooves 60 are at a location that is generally perpendicular to the aero-load direction A. The bearing housing 52 further includes an oil passage 62 and a moon groove 64 for introducing the oil to the axially extending grooves 60. The moon groove 64 is located along the perpendicular line B and increases the minimum film thickness effectively. The bearing 48 includes a plurality of apertures 66 that introduce oil to the interior of the bearing 48.

Figure 5:
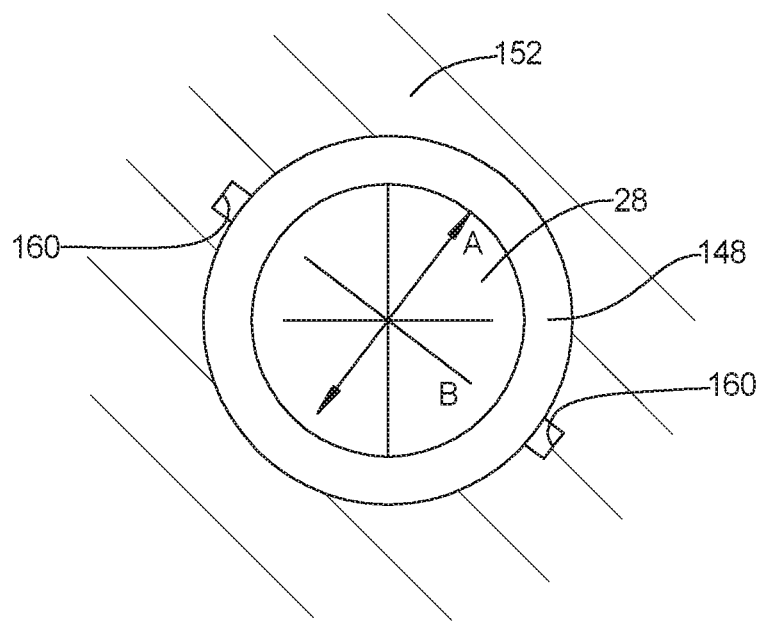
FIG. 5 is a cross-sectional view of an alternative arrangement with the axially extending grooves in the bearing housing.

As an alternative arrangement, as shown in FIG. 5, the pair of axially extending grooves 160 can be formed on an interior surface of the bearing housing 152 at a location that is generally perpendicular to the load direction A. The alternative arrangement can be utilized for a full-floating bearing 148 where the bearing is not rotationally fixed relative to the bearing housing 152. The axially extending grooves 160 can extend partially along the bearing 148 and can be in communication with an oil passage 62.

The axial grooves 60/160 make the partial admission turbocharger capable of carrying the aero-load while reducing subsynchronous vibration. Previous bearings that have been provided with a 360° circumferential acoustic groove on the outer surface of the floating bearing system provides outstanding stability for NVH. However, the bearing surface was cut in half by the circumferential groove that detrimentally impacts the load carrying capacity for partial admission turbochargers. The bearing design with a pair of axially extending grooves placed perpendicular to the loading direction provide similar function as the 360° circumferential groove for NVH while maintaining the load capacity of a wider bearing. The closed end of the grooves also limit the oil flow impact.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A partial admission turbocharger, comprising:
    a housing;
    a rotary assembly disposed within the housing and including a turbine wheel and a compressor wheel attached to one another by a shaft, the housing defining a partial admission inlet to the turbine wheel over only a portion of an annulus of the turbine so that the rotary assembly is subject to aero-load in a lateral direction; and
    a bearing disposed in the housing and rotatably supporting the shaft, the bearing including an inner bearing surface that engages the shaft and an outer bearing surface that engages the housing, the outer bearing surface having a cylindrical outer surface and a pair of axially extending grooves recessed relative to the cylindrical outer surface and extending from one end of the bearing surface and at least partially along the bearing, the pair of axially extending grooves being located perpendicular to the aero-load direction.

2. The partial admission turbocharger according to claim 1, wherein said housing includes an oil passage in communication with the bearing.

3. A partial admission turbocharger, comprising:
    a housing;
    a rotary assembly disposed within the housing and including a turbine wheel and a compressor wheel attached to one another by a shaft, the housing defining a partial admission inlet to the turbine wheel over only a portion of an annulus of the turbine so that the rotary assembly is subject to aero-load in a lateral direction; and a bearing disposed in the housing and rotatably supporting the shaft, the bearing including an inner bearing surface that engages the shaft and an outer bearing surface that engages the housing, the outer bearing surface having a cylindrical outer surface and a pair of axially extending grooves recessed relative to the cylindrical outer surface and extending from one end of the bearing surface and at least partially along the bearing, the pair of axially extending grooves being located perpendicular to the aero-load direction, wherein said housing includes an oil passage in communication with the bearing wherein the housing includes a moon groove in communication with the oil passage and located opposite to at least one of the axially extending grooves.

4. A partial admission turbocharger, comprising:

a housing including a bearing housing portion;

a rotary assembly disposed within the housing and including a turbine wheel and a compressor wheel attached to one another by a shaft, the housing defining a partial admission inlet to the turbine wheel over only a portion of an annulus of the turbine wheel so that the rotary assembly is subject to aero-load in a lateral direction; and a bearing disposed in the bearing housing portion and rotatably supporting the shaft, the bearing including an inner bearing surface that engages the shaft and an outer bearing surface that engages the bearing housing portion, the bearing housing portion having a cylindrical inner surface and a pair of axially extending grooves recessed relative to the cylindrical inner surface and extending at least partially along the bearing, the pair of axially extending grooves being located perpendicular to the aero-load direction.

5. The partial admission turbocharger according to claim 4, wherein said housing includes an oil passage in communication with the bearing.

* * * * *